H. KORN.
DISTRIBUTER FOR GRAVITY CONVEYER SYSTEMS.
APPLICATION FILED NOV. 9, 1916.
1,224,472.
Patented May 1, 1917.
2 SHEETS—SHEET 1.
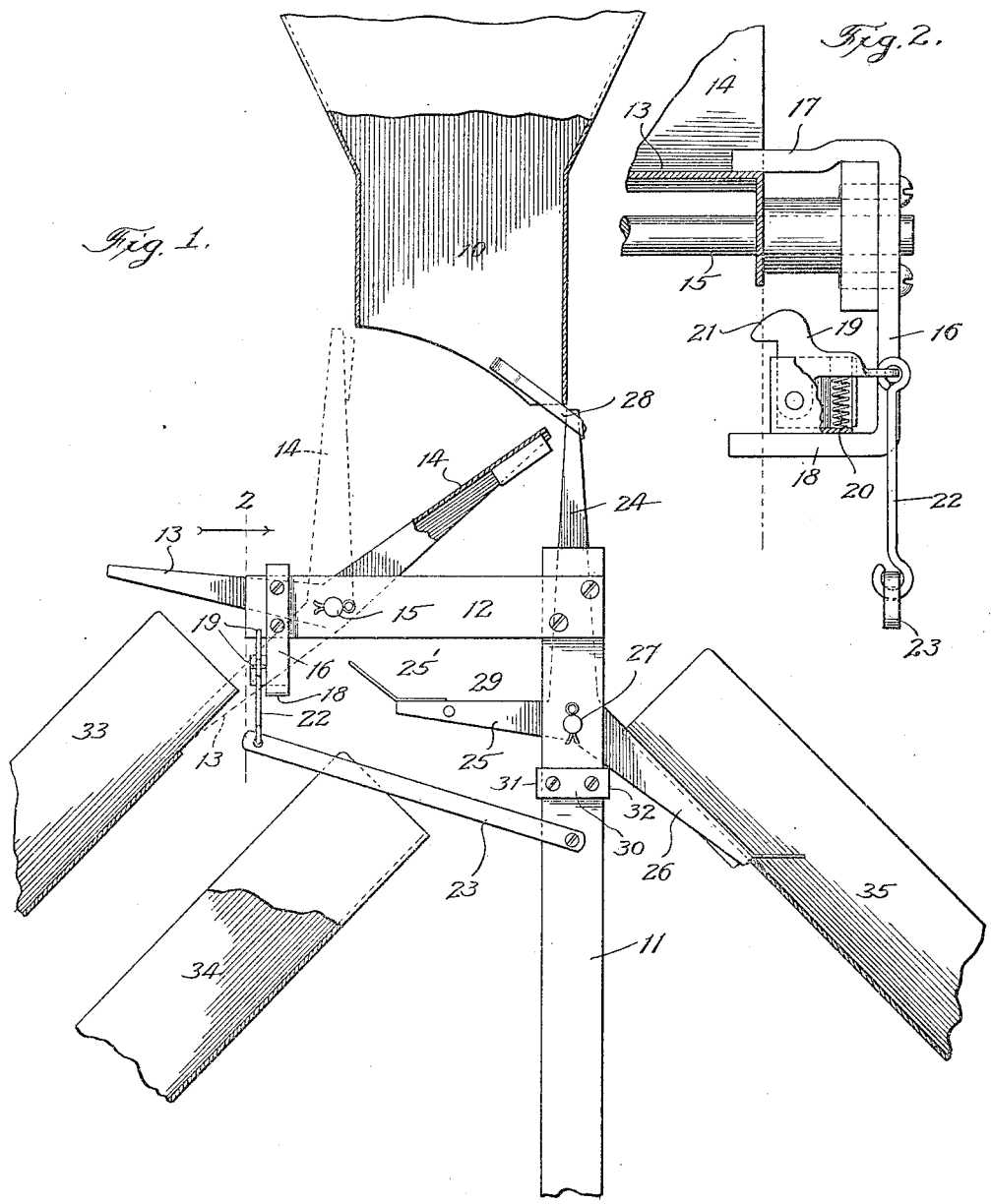
Inventor;
Henry Korn,

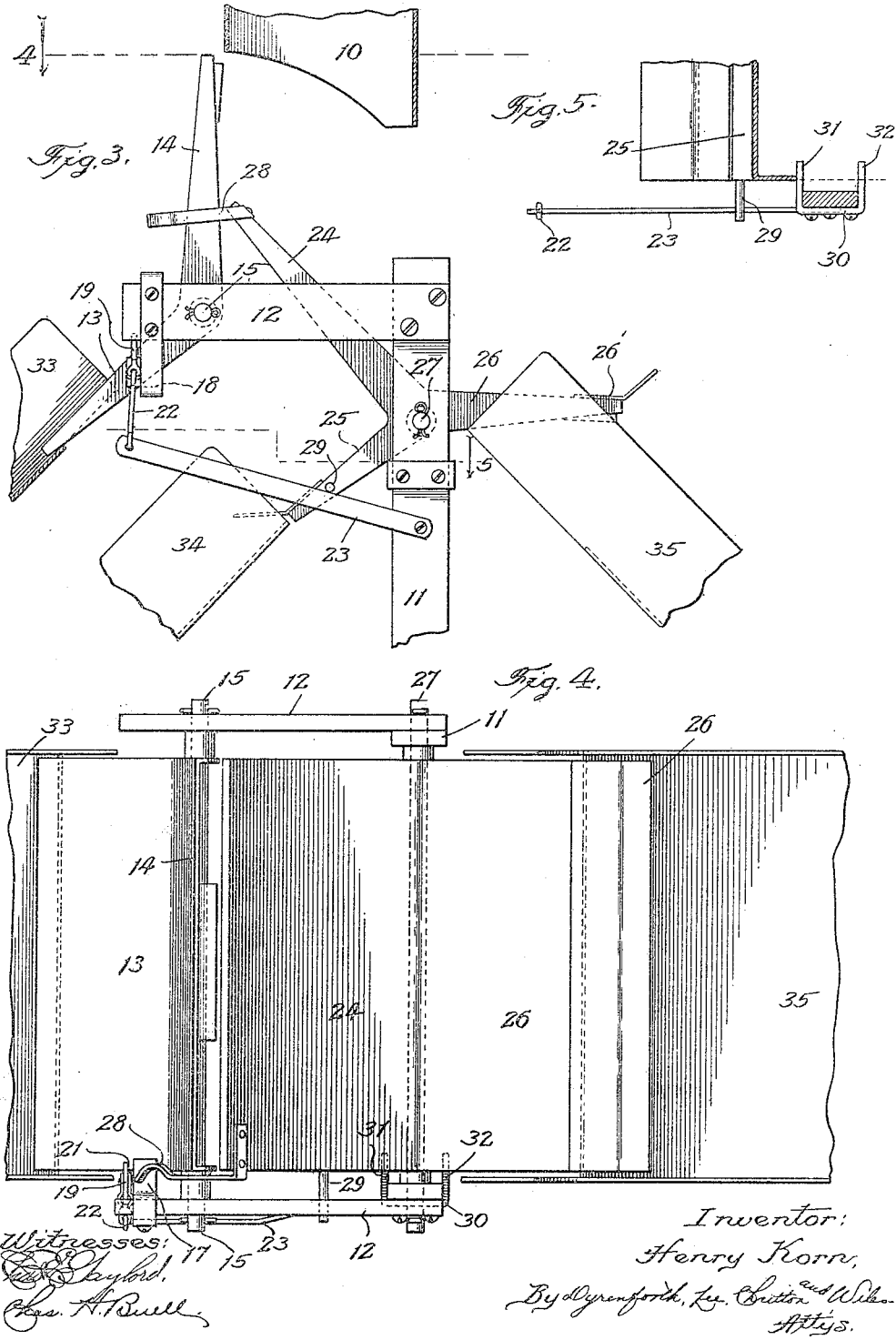

UNITED STATES PATENT OFFICE.

HENRY KORN, OF CHICAGO, ILLINOIS.

DISTRIBUTER FOR GRAVITY CONVEYER SYSTEMS.

1,224,472.   Specification of Letters Patent.   Patented May 1, 1917.

Application filed November 9, 1916.   Serial No. 130,421.

*To all whom it may concern:*

Be it known that I, HENRY KORN, a citizen of the United States, residing at Chicago, in the county of Cook and State of Illinois, have invented a new and useful Improvement in Distributers for Gravity Conveyer Systems, of which the following is a specification.

My invention relates to improvements in distributers or switching devices for use in gravity conveyer systems. The invention is particularly designed for use in bakeries, for receiving loaves from the rounder and distributing them into chutes, by which they are transmitted to the proofing-buckets. The invention will be fully understood from the following specification, taken in connection with the accompanying drawings, in which—

Figure 1 is a side elevation, partly in section, showing my distributing-device or switch and the three gravity-chutes which are fed by the distributer; Fig. 2 is an enlarged section on the line 2 of Fig. 1 showing the latch mechanism; Fig. 3 is a view similar to Fig. 1, but showing the parts in another position; Fig. 4 is a plan view of the switch proper, as indicated by the line 4 in Fig. 3; and Fig. 5 is a section on the line 5 of Fig. 3.

Referring more particularly to the drawings, the numeral 10 designates a vertical conduit or hopper from which the material to be handled is received. In the particular use of the apparatus mentioned, by way of illustration, this hopper will receive the loaves or balls of dough directly from the rounder. Below the conduit 10 there is mounted a frame comprising vertical members 11 having horizontal arms 12 secured near their upper ends. Pivoted horizontally between the free ends of the horizontal arms 12 there is a rocking switch-member having two sections 13, 14 arranged at an obtuse angle to one another, the two sections intersecting substantially along the axis of the pivot 15. For limiting the rocking movement of the platform-switch, one of the arms 12 has secured thereto a C-shaped bracket 16 having upper and lower ends 17 and 18 extending inwardly into the path of movement of the section 13. The lower end 18 further carries a pivoted latch-member 19, which is normally held in the path of the section 13 by the spring 20. The upper end of this latch is inclined, as shown at 21, so that in the downward movement of the section 13 the latch is moved outwardly against the pressure of its spring to permit the switch-section to pass down and rest upon the arm 18, in which position it is automatically secured by the latch. For releasing the latch from the arm, the former has caught therein a depending link 22 secured in the free end of a lever 23 pivoted on the vertical arm 11.

The second switch-member is made up of three sections, 24, 25 and 26, arranged at such angles as to form a substantially Y-shaped member in cross-section, the pivot 27 being located approximately on the line of intersection of the three sections and being journaled in the vertical arms 11. The upper end of the section 24 has secured to its edge a spring-finger 28 which in one position of the parts is adapted to spring over and engage the edge of the section 14 of the first switch-member, as is illustrated in Fig. 3. The section 25 of the second switch-member has a pin 29 secured in one edge thereof and extending outwardly to engage the upper face of the lever 23 to depress the latter and through such motion release the latch 19 when the parts are in the position shown in Fig. 3. One of the frame-members 11 is provided with a U-shaped or C-shaped bracket 30 the inwardly-extending arms 31, 32 of which limit the rocking movement of the second switch-member by engaging, respectively, the sections 25 and 26 thereof.

To receive the material distributed by the automatically-operating switch there are provided downwardly-inclined chutes 33, 34 and 35, arranged in the manner shown in the drawing, that is, in substantial parallelism with the sections 13 of the first switch-member and 25 and 26 of the second switch-member when these sections are in their respective discharging positions. The sections 13 and 14 of the first switch-member are preferably balanced by suitable counterweights, so that this member will come to rest by gravity either in the position shown in full lines in Fig. 1 or in the position shown in full lines in Fig. 3. The three sections 24, 25, 26 of the second switch-member are so balanced with relation to each other that this member will remain at rest either in the position shown in full lines in Fig. 1, or in the position shown in full lines in Fig. 3.

The operation of the device is as follows. Assuming that the parts are in the position shown in full lines in Fig. 1, a ball of dough delivered from the rounder through the conduit 10 will fall upon the section 14 and roll down the latter onto the section 13. By its weight upon this latter member, the switch will be oscillated in a counter-clockwise direction, as viewed in Fig. 1, and to the position shown in dotted lines therein, whereby the ball of dough will be discharged from the section 13 to the chute 33, to be delivered by the latter into its proper place in the proofing-bucket. Through the engagement of the latch 19 at the edge of the section 13, the latter will be locked in the position to which it has fallen, being thereby prevented from rebounding so far as to return to its initial position. As before stated, the switch-member is so balanced as to remain by gravity in the position shown by dotted lines in Fig. 1, but in practice I have found that, where the parts are so nicely balanced and adjusted as to insure their positive operation, it will sometimes happen that the switch-member will re-bound or re-coil to its initial position after having been actuated by the falling mass of dough. The latch 19 prevents such operation and insures the regular functioning of the apparatus.

The first switch-member having been turned to the position shown in dotted lines in Fig. 1, by the weight of the ball of dough, as above described, the next succeeding ball of dough will fall directly through between the sections 14 and 24 to come to rest on the section 25. I prefer to provide the latter with an upwardly-inclined end-portion 25' of sufficient size to prevent the dough-ball from rolling or bounding over the end at its first impact. By the weight of the ball resting upon the section 25, the second switch-member will be oscillated to the position shown in full lines in Fig. 3, the ball being thereby delivered to the chute 34. In such rocking movement of the second switch-member, the spring-finger 28 will engage over the edge of the section 14 of the first switch-member, while the pin 29 will simultaneously depress the lever 23 to release the latch 19 and hold the latter in the released position. The parts now being in the position shown in Fig. 3, a third ball of dough will be delivered through the conduit 10 to strike the other face of the section 24 and, rolling down the latter, bring its weight to bear upon the section 26. Here, also, I prefer to provide an inclined end-portion 26' which will hold the dough-ball upon the platform. By the weight of the ball, the second switch-member will now be rocked in a clockwise direction back to the position shown in Fig. 1, and in such movement the spring-finger 28 will draw the first switch-member after it until the latter passes its dead center, when it will return by gravity to its initial position, as shown in full lines in Fig. 1. Simultaneously with the delivery of the third dough-ball to the chute 35, therefore, the parts will have been returned to their initial position and the apparatus prepared for repeating its cycle of operation.

While I have shown and described in considerable detail one specific embodiment of my invention, it is to be understood that this showing and description is illustrative only and for the purpose of making the invention more clear, and that I do not regard the invention as limited to these details or to any of them, except in so far as such limitations are included within the terms of the following claims, in which it is my intention to claim all novelty inherent in my invention as broadly as is permissible in view of the prior art.

What I claim as new and desire to secure by Letters Patent is—

1. A three-way distributing switch for gravity conveyer systems comprising, in combination, a horizontally journaled rocking switch-member adapted to receive material on, and discharge material from, its two faces alternately, a second rocking switch-member horizontally journaled and having a section adapted to swing over and swing away from one side of said first-named switch-member, and connections for operating said second-named switch-member from said first-named switch-member.

2. A three-way switch for gravity conveyer systems comprising, in combination, a horizontally-journaled rocking switch-member adapted to receive material on, and discharge material from, its two faces alternately, a second horizontally-journaled switch-member having an upper section adapted to swing over and swing away from one face of said first-named switch-member, means for locking said second-named switch-member in a position to expose the said face of the first-named switch-member, and means actuated by the movement of said first-named switch-member when discharging material from the said face for releasing said lock.

3. A three-way distributing switch for gravity conveyer systems comprising, in combination, a horizontally journaled rocking switch-member adapted to receive material on, and discharge material from its two faces alternately, a second horizontally-journaled switch-member having a platform-portion arranged above its journal and adapted to swing over, and swing away from the adjacent face of said first-named switch-member, means for locking said second-named switch-member in a position away from the said face, means operable by movement of the said face toward the second-named switch-member for releasing said lock, and means operable by movement of the said face away from the second-named switch-member for swinging the latter to a position over the said face.

4. A three-way distributing switch for gravity conveyer systems comprising a rocking switch-member having three sections arranged at angles to one another, the said switch-member being horizontally journaled substantially upon the line of intersection of the said sections, a second switch-member comprising two sections extending on opposite sides of a horizontal journal spaced away from the journal of said first member, said second switch-member being adapted to swing toward and away from said first member, means operable by movement of said first-named switch-member away from said second-named switch-member for causing the latter to blank the adjacent face of said first-named switch-member, and means operable by impact of material on said second-named member for moving it to a position to expose the adjacent face of the first-named switch-member.

HENRY KORN.

Copies of this patent may be obtained for five cents each, by addressing the "Commissioner of Patents, Washington, D. C."